United States Patent

Hagman

[11] Patent Number: 5,737,166
[45] Date of Patent: Apr. 7, 1998

[54] PROTECTIVE EQUIPMENT IN A BIPOLAR HVDC STATION

[75] Inventor: Ingvar Hagman, Ludvika, Sweden

[73] Assignee: Asea Brown Boveri AB, Västerås, Sweden

[21] Appl. No.: 626,027

[22] Filed: Apr. 1, 1996

[30] Foreign Application Priority Data

Apr. 7, 1995 [SE] Sweden .................. 9501296

[51] Int. Cl.$^6$ .................. H02H 3/00
[52] U.S. Cl. .................. 361/78; 361/62; 361/115
[58] Field of Search .................. 361/58, 78, 115, 361/93, 91, 62, 64, 66

[56] References Cited

U.S. PATENT DOCUMENTS 3,952,210  4/1976  Kanngiesser .................. 307/82

Primary Examiner—Jeffrey A. Gaffin
Assistant Examiner—Stephen Jackson
Attorney, Agent, or Firm—Pollock, Vande Sande & Priddy

[57] ABSTRACT

Protective equipment in a bipole converter station of an installation for power transmission by means of a high voltage direct current having main circuits on the dc side of the station. The main circuits have two separate pole parts, one part for each one of the two poles of the station, and a bipole part that is common to both poles. Measuring means in the station form measurement signals which correspond to operating quantities of the station. The measurement signals are supplied to the protective equipment. The protective equipment, dependent on the measurement signals and in their quarters with predetermined algorithm, takes measures to avoid permanent faults by influencing the operation of the station. The protective equipment has a pole protective means for each pole part and a bipole protective means for protection of the bipole part. The bipole protective means has two parts which are independent of each other, each of which is assigned to one of the two pole parts of the station, one to each pole part. The measuring means generates two redundant measuring signals, each of which is supplied to one of the independent parts of the bipole protective means. The bipole protective means that is assigned to a certain pole part only interrupts the operation of that pole part to which it is assigned and not the operation of the other pole part.

10 Claims, 8 Drawing Sheets

5,737,166

PROTECTIVE EQUIPMENT IN A BIPOLAR HVDC STATION

TECHNICAL FIELD

The present invention relates to protective equipment in a bipolar converter station of an installation for power transmission by means of high-voltage direct current, wherein the main circuits on the dc side of the station have two separate pole parts, one part for each one of the two poles of the station, and one part which is common to both poles, the bipole part, the station has measuring means adapted to form measurement signals corresponding to operating quantities of the station, which measurement signals are adapted to be supplied to the protective equipment, the protective equipment is adapted, in dependence on the measurement signals and in accordance with predetermined algorithms, to selectively take measures to avoid permanent faults by influencing the operation of the station, the protective equipment has one pole protective means for each pole part and one bipole protective means for the bipole part, the bipole protective means has two parts which are independent of each other, and the measuring means are adapted, for each one of a group of operating quantities of the bipole part, to generate two redundant measurement signals, which are each adapted to be supplied to one of the above-mentioned independent parts of the bipole protective means.

BACKGROUND ART

A typical installation for power transmission by means of high-voltage direct current—an HVDC installation—comprises two converter stations which are interconnected by means of a dc line which has two conductors. Each converter station has two 12-pulse converters series-connected on the dc side. The point of connection of the converters is, in normal operation, connected to an electrode line which is grounded at the other end and which is located at ground potential. The terminals of the converters which are facing away from the connection point are connected to the two conductors of the dc line, which conductors are at a positive and a negative potential, respectively, relative to ground. An installation of this kind is called a bipolar installation. In connection with certain faults or during maintenance work, the converters connected to one of the dc conductors of the tranmission may be taken out of operation and the installation be operated in monopolar operation, in which case the return current is carried through ground or through the last-mentioned conductor.

A converter station in an installation of the above kind has two pole parts which are identical and each of which consists of one of the converters and certain filter circuits, measuring means and switching means connected to this converter. In addition, the installation has a bipole part, which comprises means which are common to the converters, such as the electrode line, a station ground, and certain busbars and switching means for connecting together those terminals of the converters which are facing ground and for connection of these to the electrode line, to station ground, or to one of the conductors of the dc line for using this conductor as a return conductor.

It is known to provide a station of the above kind with one piece of protective equipment for each pole. Such equipment senses a plurality of quantities, primarily currents and voltages, which are related to the operating state of the pole part. On the basis of predetermined algorithms or criteria, the protective equipment detects abnormal operating states of the pole part and acivates a number of suitable protective measures to avoid permanent faults in the installation. Examples of such abnormal operating states are overcurrent, internal short circuit, ground fault, interruption, undervoltage, and overvoltage. Examples of protective measures are tripping of circuit breakers on the ac side of the converter, blocking of the converter, isolation of the converter by opening the switching means which connects the converter to the line and to the neutral bar of the station, and controlling of the converter to full inverter operation. Normally, blocking of the converter is carried out in case of a detected fault, and a fault generally means that the operation of the pole in question is interrupted for a period of time. However, this does not entail any serious disadvantage, since operation may continue with the remaining pole. Since an installation of this kind can be overloaded for a limited time, the loss in the power transmission of the installation is limited.

Regarding the bipole part, however, the conditions are different. Normally, currents and voltages are low in the bipole part, which reduces the risk of faults therein. In certain installations, therefore, this part has been left unprotected, which, may entail negative consequences. Since the bipole part is common to both poles and since the operation of the station cannot be maintained in case of a fault in the bipole part, existing protective means for the bipole part in case of a detected fault in the bipole part have given a tripping signal to both poles, which has resulted in blocking of the two converters of the station and complete termination of the power transmission of the installation. Since the transferred power of an installation of the kind referred to here generally constitutes an important part of the power in the two ac networks it connects, a total loss of the transferred power will often result in serious disturbances of the operation in these ac networks. To increase the reliability, bipole protective means have been designed with two parts which are independent of each other. These parts have been provided with measurement signals from different measuring channels of the measuring means of the equipment. The tripping signals from the two parts of the bipole protective means have been supplied to the control equipment of the poles in parallel. It has proved that, although redundancy in this way has been introduced in the protective equipment for the bipole part, unnecessary total shutdowns with their serious consequences will be caused by the bipole protective equipment because of, for example, faulty measurement signals, forgotten groundings during maintenance work on a pole, or by test signals during maintenance work on a pole during monopolar operation. Further, no part of the redundant bipole protective equipment could ever be taken out of operation, for example for maintenance work, since the redundance necessary for satisfactory reliability then disappeared.

SUMMARY OF THE INVENTION

The object of the invention is to provide protective equipment of the kind described in the introduction, which provides improved protection of the bipole part of the station, which greatly reduces the risk of loss of both poles and hence ensures maximum availability and reliability of the installation, which eliminates the risk that faulty measurement signals will cause loss of both poles, which offers a possibility of maintenance work on one of the poles during monopolar operation, or on the bipole part, with a minimum risk of unjustified tripping of the pole which is in operation.

BRIEF DESCRIPTION OF THE DRAWINGS

The invention will be explained in greater detail in the following with reference to the accompanying FIGS. 1–8.

DESCRIPTION OF THE PREFERRED EMBODIMENTS

Figure 1:
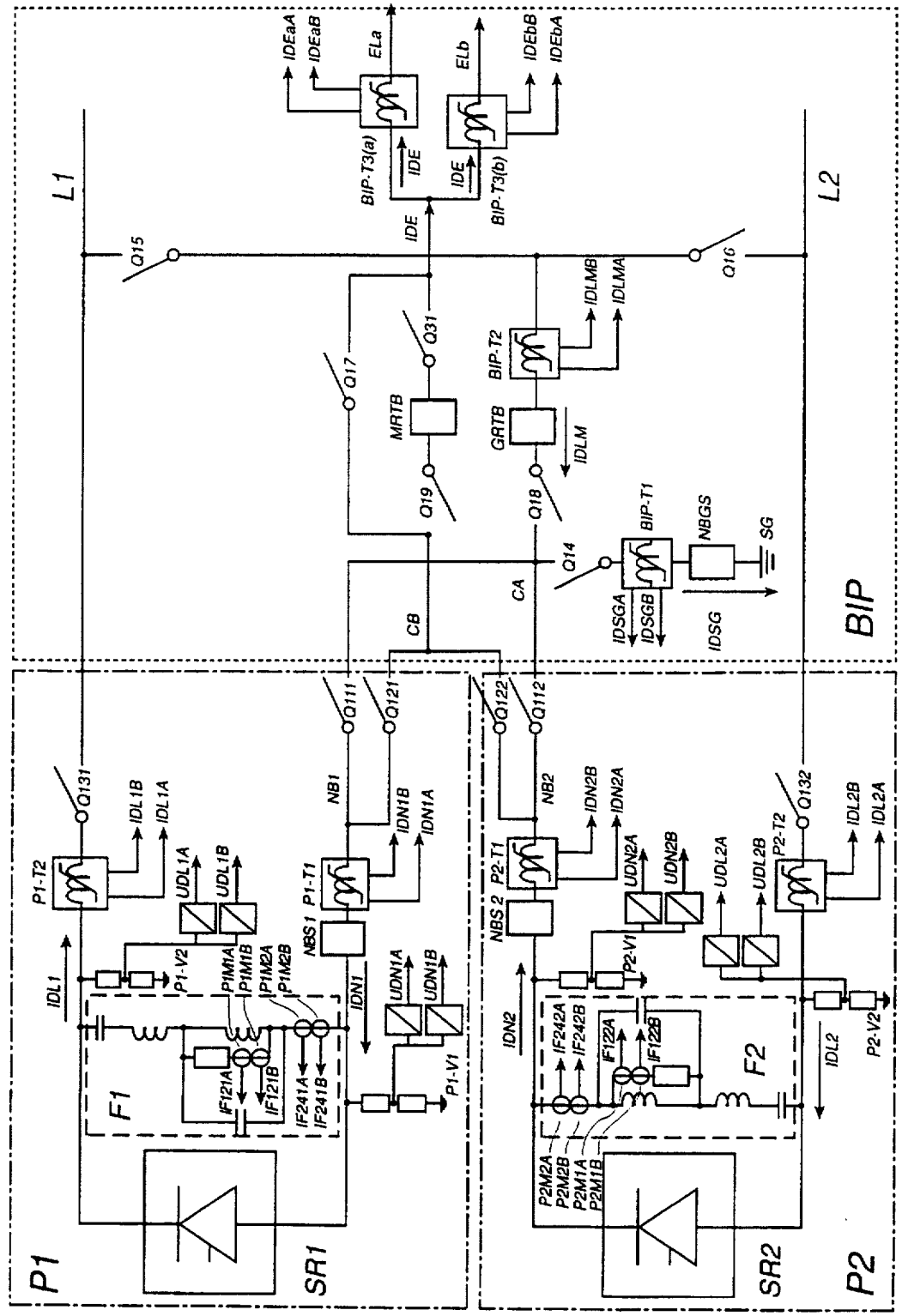
FIG. 1 shows the main circuits on the dc side of a typical converter station.

FIG. 1 shows the main circuits on the dc side of a typical bipolar converter station in an HVDC installation. The station has two high-power converters, SR1 and SR2, adapted to convert power between an ac power network (not shown) and the dc side of the station. The station is connected to another converter station (not shown) through the dc lines L1 and L2.

As shown by dashed lines in the figure, the main circuits of the station on the dc side consist of two identical parts P1 and P2 (referred to in the following as pole parts) which are separate from each other and which are each assigned to one pole of the station, and a part BIP which is common to both poles (referred to in the following as the bipole part).

The two pole parts are, in principle, independent of each other, and the operation of the station can be maintained—although with reduced power—if one of the pole parts is taken out of operation and disconnected. The common bipole part, on the other hand, is necessary for the operation of the station, and a fault in the bipole part and a disconnection thereof entails loss of the entire station.

The pole part P1 comprises the converter SR1, the upper dc terminal of which in the figure can be connected to the dc line L1 by means of a disconnector Q131. The lower dc terminal of the converter is connected, via the neutral bar NB1 of the pole in which a circuit breaker NBS1 is arranged, to the disconnectors Q111 and Q121, by means of which the converter can be connected to the bipole part. A harmonic filter F1 is arranged in parallel with the converter for filtering the harmonics of the ordinal numbers 12 and 24.

The pole part P1 is provided with measuring transductors P1-T1 and P1-T2 for measuring the currents IDL1 and IDN1 on the two sides of the converter. Each measuring transductor is provided with two separate measuring channels and supplies two redundant measurement signals, which are designated IDL1A, IDL1B and IDN1A, IDN1B, respectively. Further, the pole part P1 has two measuring voltage dividers P1-V1 and P1-V2. These have single main circuits but redundant instrumentation amplifiers, which supply the measurement signals UDN1A, UDN1B and UDL1A, UDL1B, respectively, which correspond to the direct voltages on the two sides of the converter. Further, there are instrument transformers P1-M1A, P1-M1B and P1-M2A, P1-M2B, respectively, the output signals of which, IF121A, IF121B and IF241A, IF241B, respectively, are used for measuring the harmonic currents of the ordinal numbers 12 and 24 in the filter F1.

The pole part P2 is built in the same way and the designations of these components and signals correspond to the corresponding designations in the pole part P1 with the difference that a figure "1" in the designations is replaced by "2".

The bipole part BIP comprises busbars and switching means for alternative connection of each one of the neutral bars NB1 and NB2 of the poles to an electrode line EL with two parallel branches ELa and ELb, to a station ground SG or to the dc line of the other pole. The neutral bars of the poles can be connected, by means of the disconnecting switches Q111 and Q112, respectively, to a connection point CA and from there, either via a disconnector Q14 and a circuit breaker NBGS to the station ground SG or via a disconnector Q18, a circuit breaker GRTB and the disconnectors Q15 and Q16, to one of the lines L1 and L2. Further, the neutral bars can be connected by means of the disconnectors Q121 and Q122, respectively, to a connection point CB and from there via a circuit breaker MRTB to the electrode line. To make possible maintenance of the circuit breaker MRTB without taking the electrode line out of operation, the circuit breaker can be bypassed by a disconnector Q17 and be disconnected by the disconnectors Q19 and Q31.

The bipole part BIP has a measuring transductor BIP-T1 for measuring the current IDSG to the station ground SG. A second measuring transductor BIP-T2 measures the current IDLM through the branch which comprises the circuit breaker GRTB. Two measuring transductors BIP-T3a and BIP-T3b measure the currents IDEa and IDEb in the two electrode line branches ELa and ELb. In the same way as the measuring transductors of the pole parts, each one of the measuring transductors is provided with two parallel measuring channels for supplying two redundant measurement signals. The measurement signals are designated IDSGA and IDSGB, IDLMA and IDLMB, IDEaA and IDEaB, as well as IDEbA and IDEbB.

During normal bipolar operation, the disconnectors Q111, Q112, Q121, Q122 are closed and the neutral bars of the poles are connected to the connection points CA and CB. The disconnectors Q15 and Q16 and the circuit breakers NBGS and GRTB are open, that is, the connection point CA is neither connected to station ground nor to any of the lines L1, L2. The disconnectors Q19 and Q31 and the circuit breaker MRTB are closed (and the disconnector Q17 is open), that is, the neutral bars of the poles are connected to the electrode line. The lines L1 and L2 carry substantially equal currents and have substantially equal voltages relative to ground, but with opposite polarities. The current in the electrode line is low, and the bipole part and the neutral bars of the poles are at low potential relative to ground.

The station ground SG cannot carry current continuously. However, it can be used for balanced bipolar operation—in which case the converters are controlled such that their currents become equal—for example, during maintenance work on the electrode line. Further, the station ground is used temporarily for certain fault cases.

During certain faults, one of the two converters is blocked. Blocking of one converter, for example SR2, means in principle that the direct voltage of the converter is reduced to zero by blocking the ordinary control pulses to the converter valves. Possibly, bypass valve pairs in the converters are also fired. Prior to the blocking, the converter may be controlled to inverter operation for reducing the current thereof. Further, the converter can be isolated by opening the associated disconnectors Q112, Q122, Q132 and the circuit breaker NBS2.

When blocking one converter—in the assumed case the converter SR2—the other converter (SR1) continues operation and its load current will flow through the electrode line. The installation is now operating in monoplar operation. During monopolar operation for a long period of time, the installation is usually switched over to operation with metallic return to avoid high continuous ground currents. The disconnector Q16 and the circuit breaker GRTB are thus closed, whereupon the circuit breaker MRTB is opened and the load current commutates over from the electrode line to the line L2. Return to bipolar operation can be performed (besides by operation of suitable disconnectors) by closing of the circuit breaker MRTB and opening of the circuit breaker GRTB as well as connection and deblocking of the previously blocked converter.

Figure 2:
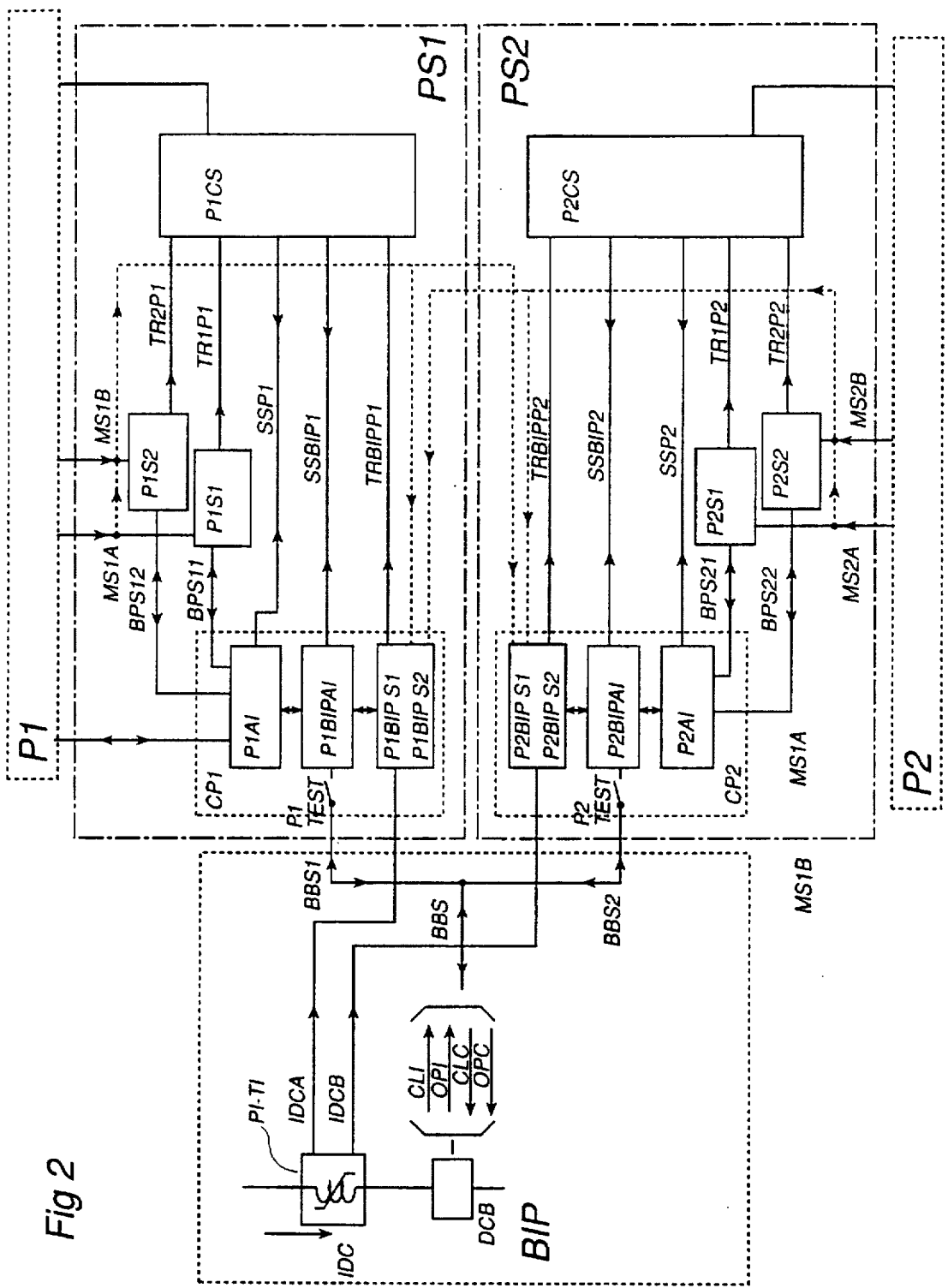
FIG. 2 shows the principle of the design of the protective circuits according to the invention in a converter station of the kind shown in FIG. 1.

FIG. 2 shows an example of protective equipment according to the invention for the converter station shown in FIG. 1. The figure schematically shows the three parts P1, P2 and BIP of the main circuits. In the bipole part, a bar which carries the current IDC, a circuit breaker DCB and a measuring device PI-TI are symbolically shown. These are intended to represent the electric switching devices (the circuit breakers and the disconnectors) and the current measuring means of the bipole part, all of which are shown in FIG. 1. From one of the measuring channels of the measuring devices, the measurement signals IDCA are obtained, and from the other channel the measurement signals IDCB are obtained. With the protective equipment of the station, the command and status signals BBS are exchanged, which for each relevant circuit breaker or disconnector consist of the command signals CLC and OPC for closing and opening, respectively, of the electric switching device, as well as the status signals CLI and OPI which indicate the closed and open positions, respectively, of the electric switching device.

The protective equipment according to the invention consists of two identical parts PS1 and PS2, one for each pole.

The part PS1 of the protective equipment has, for protection of the pole part P1, two redundant pole protective means P1S1 and P1S2 of a kind known. Each pole protective means receives measurement signals, MS1A and MS1B, respectively, from the pole part, preferably from redundant measuring means. Further, via an apparatus interface P1A1, the pole protective means exchange command and status indication signals BPS11, BPS12 with circit breakers and disconnectors arranged in the pole part.

Each one of the two pole protective means comprises a plurality of protective functions previously known for pole part P1, for example overcurrent protection
protection during short circuit and commutating faults
ground fault protection for the line L1 of the pole
protection of the circuit breakers included in the pole part.

The two pole protective means are designed such that a desired degree of redundancy is obtained as regards essential functions. This can be achieved by the protective means being identical. Alternatively, at least some of the protective functions may be different in the two protective means but should be designed so as to provide overlapping protection.

Dependent on the received measurement and status signals, the pole protective means determines, according to predetermined algorithms, any measures that may have to be taken to protect the installation and delivers the necessary command signals. These may take the form of a tripping signal, TR1P1 or TR2P1, to the control system P1CS of the pole part P1 for blocking the converter and/or command signals via the interface P1AI (which is arranged in the same apparatus cubicle CP1 as the bipole protective means P1BIP, see below) for closing or opening of one or a few of the switching means of the pole part.

The part PS1 of the protective means further comprises a bipole protective means arranged in an apparatus cubicle CP1 and consisting of two sets P1BIPS1 and P1BIPS2. The two sets receive the measurement signals IDCA from one of the measuring channels of the measuring transductor PI-TI (and from the corresponding measuring channels of the other measuring means (not shown) of the bipole part). Via an apparatus interface P1BIPAI, the bipole protective means exchanges the above-mentioned command and status signals BBS1 with the switching means of the bipole part. The status signals—SSBIP1—are also forwarded from the apparatus interface to the control system P1CS of the pole P1. The command and status signals BBS1 pass between the apparatus interface P1BIPAI and the switching means via a test switch P1TEST. The test switch is normally closed. In the open position, it prevents order signals (CLC, OPC) from the relevant part of the bipole protective means to the switching devices (e.g. MRTB, GRTB, NBGS) present in the bipole part (BIP) from causing an operation of these electric switching devices. This is achieved, for example, by a test switch in the open position disconnecting the supply voltages to each apparatus.

To achieve the greatest possible independence of the other units in the protective equipment, the bipole protective means and its apparatus interface are placed in a separate cubicle CP1.

In addition to the above-described measurement signals IDCA from the measuring means in the bipole part of the station, the bipole protective means also receives measurement signals from certain measuring means which are arranged in the pole part P1 and the measurement signals of which are required for protection of the bipole part of the station. One example of such a measuring means is the measuring transductor P1-T1, the measurement signal of which is required, inter alia, for protection of the bipole part of the neutral bar. The measurement signals from this measuring means are supplied to the bipole protective means for pole P1, and then such that one measuring signal (e.g. channel A) is supplied to the set P1BIPS1 of the bipole protective means, and the other measurement signal (channel B) is supplied to the set P1BIPS2 of the bipole protective means. This is schematically shown in FIG. 2 by the dashed lines for the signals MS1A and MS1B. In a corresponding way, the same signals are also supplied to the bipole protective means in the part PS2 of the protective means, where, however, the signals are only used for alarm and for pole balancing. Also this signal path is shown in dashed line in the figure. As is clear from FIG. 2, the corresponding signal exchange also takes place from the pole part P2 to the upper part P1 of the protective equipment.

The two sets P1BIPS1 and P1BIPS2 of the bipole protective means operate parallel to each other. Each set provides a plurality of protective functions for the bipole part of the station, for example

- differential protection for the bipole part of the neutral bar,
- ground-fault protection for the metallic return,
- protection of the circuit breakers included in the bipole part, and
- overcurrent protection for the station ground.

Figure 5:
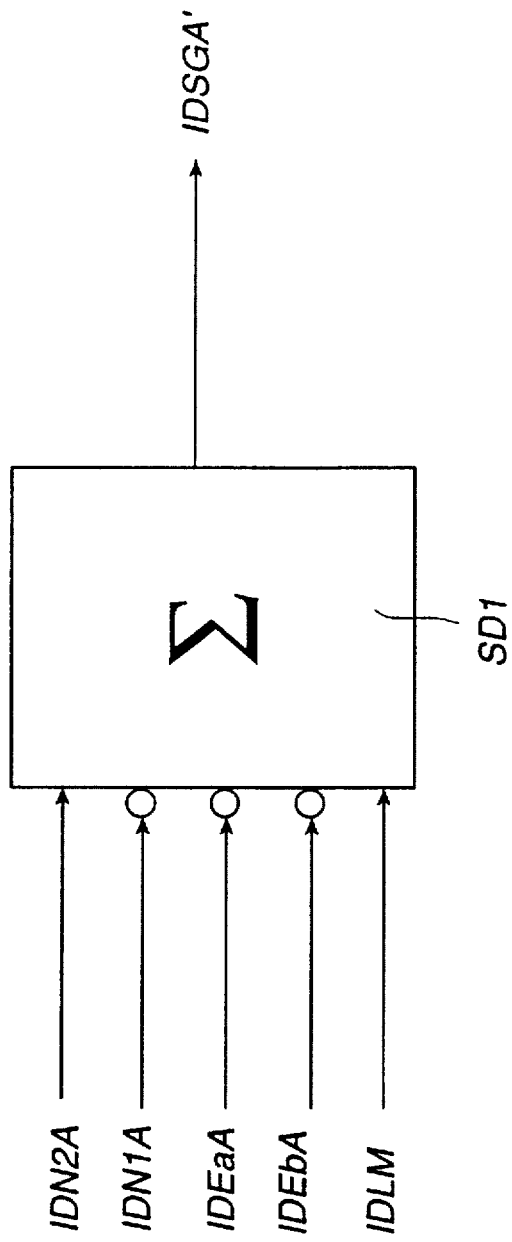
FIG. 5 shows how, in order to attain redundancy, a measured value of a current can be formed on the basis of measured values of other currents.

The two sets are designed such that they jointly provide redundancy for at least the most important protective functions of the bipole protective means. This is achieved by the two sets at least partially using different measurement signals and/or different algorithms, and such that each set separately provides the desired degree of protection for the bipole part. For example, the overcurrent protective means for the station ground in one of the sets may use the direct measurement signal IDSGA from the measuring transductor BIP-T1, whereas the same overcurrent protective means in the other set forms a measured value of the current IDSG by summing the measured values from the measuring means P1-T1, P2-T1, BIP-T2, BIP-T3a and BIP-T3b. In this way, a high degree of redundancy is obtained both as in regards to the two sets of the bipole protective means and as is regards to the measuring means used. This is illustrated in FIG. 5 which shows a summation member SD1. To this there are fed the measurement signals from the above-mentioned measuring means, and the summator forms a measured value IDSGA' of the current IDSG according to the following relationship given by Kirchhoff's law $$IDSGA'=IDN2A-IDN1A-IDEaA-IDEbA+IDLM$$

where the signs are determined by the polarities of the currents as shown in FIG. 1. The set P1BIPS1 of the bipole protective means is then supplied with one of the two measured values of the current IDSG, for example IDSGA from the measuring means BIP-T1, and the other set P1BIPS2 is supplied with the other measured value, that is, IDSGA' from the summator SD1.

Dependent on the received measurement and status signals, the bipolar protection determines, according to predetermined algorithms, any measures that may have to be taken to protect the installation and delivers the necessary command signals. These may take the form of a tripping signal TRBIPP1 to the control system P1CS of the pole part P1 for blocking of the converter of the pole and/or of command signals (via the interface P1BIPAI) for closing one or a few of the switching means of the bipole part.

The part PS2 of the protective equipment is designed in the same way as the part PS1, and its units have the same designations with the pole designation "1" replaced by "2". An exception from this is the bipole protective means in part PS2 being supplied with the measurement signals IDCB from the measuring means in the bipole part. The second exception consists of both the bipole protective means and the pole protective means in this part of the station protective means being supplied with measurement signals from the pole part P2 (instead of from the part P1). This results in the two parts PS1 and PS2 of the protective equipment of the station being supplied with measurement signals independently of each other.

Figure 3:
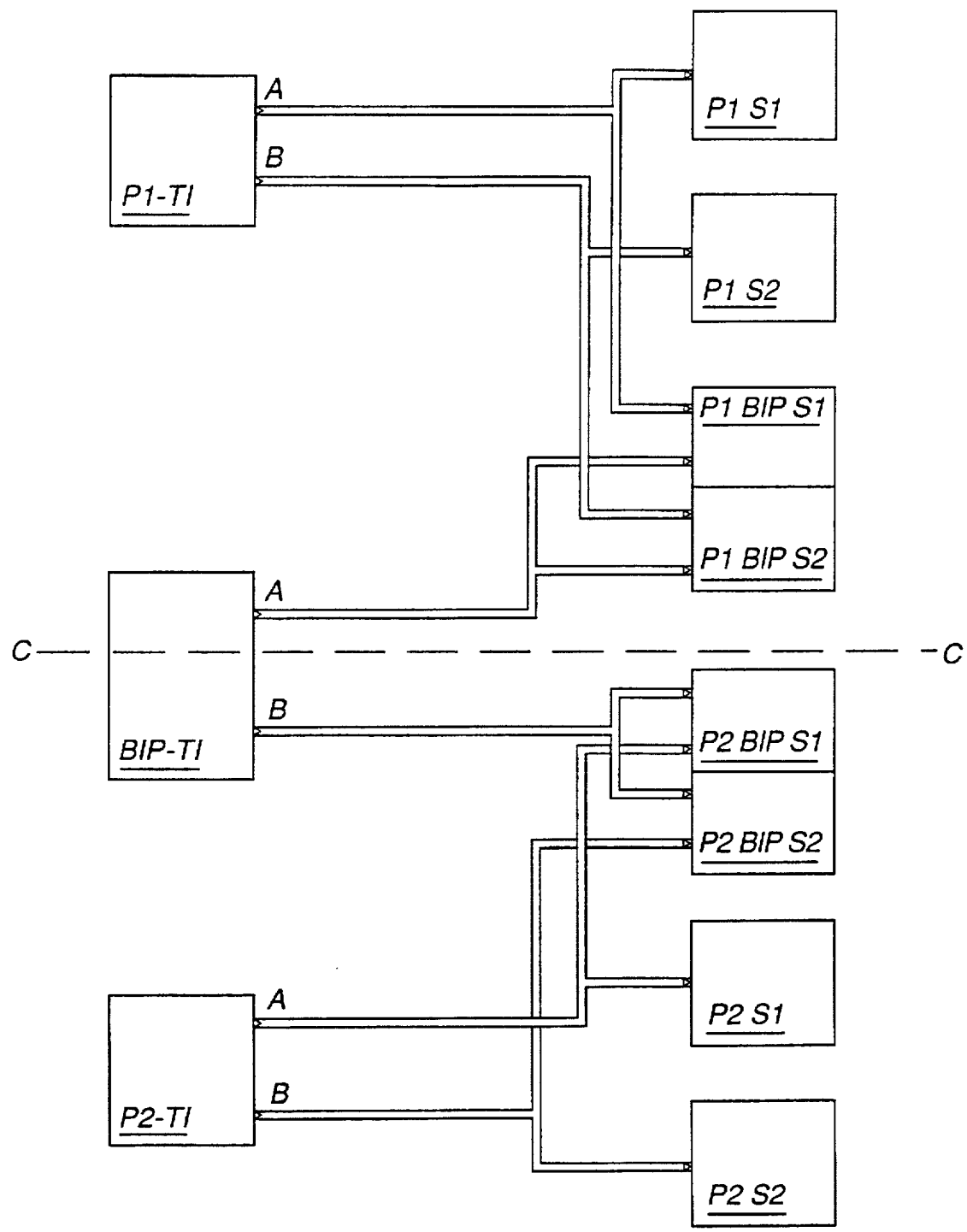
FIG. 3 illustrates how the signals from the measuring means of the station are supplied to the different parts of the protective equipment.

FIG. 3 illustrates how the measurement signals from the various parts of the station are supplied to the various parts of the station protective means. On the lefthand side, there are symbolically shown the measuring means P1-TI in the pole part P1 (i.e. in the station according to FIG. 1, e.g. the measuring transductors P1-T1 and P1-T2), the measuring means BIP-TI in the bipole part (i.e. in FIG. 1 the measuring transductors BIP-T1 through BIP-3b), and the measuring means P2-TI in the pole part P2 (e.g. the measuring transductors P2-T1 and P2-T2). The two separate measuring channels of the measuring means are designated A and B. On the righthand side in FIG. 3, there are shown the two sets of each one of the pole protective means and the bipole protective means, the units have the same designations as in FIG. 2. The measurement signals from the measuring channels A in the pole part P1 are supplied to set 1, and the measurement signals from the measuring channels B are supplied to set 2, of the pole protective means and the bipole protective means which are assigned to the pole P1. In the same way, the measurement signals from the measuring channels A in the pole part P2 are supplied to set 1, and the measurement signals from the measuring channels B are supplied to set 2, of the pole protective means and the bipole protective means which are assigned to the pole P2. The measurement signals from the measuring channels A of the measuring means of the bipole part are supplied to both sets of the bipole protective means assigned to the pole P1, and the measurement signals from the measuring channels B of the measuring means of the bipole part are supplied to both sets of the bipole protective means assigned to the pole P2. As is clear from the drawings, those parts of the equipment which are located above and below the dashed line C—C in FIG. 3 are independent of each other. A fault in any part of the equipment in the upper part in FIG. 3, for example a fault in a measuring channel of a measuring means, does not at all influence the protective means in the lower part, and vice versa.

The only exception from the principle of independence described above are those measuring signals from one pole part, for example P1 (the measurement signals from the measuring transductor P1-T1) which are supplied to the bipole protective means (P2BIPS1/S2) of that part of the protective equipment (PS2) which is assigned to the other pole. As mentioned above, these signals can only cause alarm and/or pole balancing in the latter part of the protective equipment and a faulty measurement signal cannot cause any operational disturbance.

As is clear from FIG. 2, the switching means of the bipole part are influenced by the two bipole protective means in parallel. However, the bipole protective means are connected to the switching means via individual test switches P1TEST and P2TEST.

As will be clear from the above description, a simple measurement fault, that is, a measurement fault in one single measuring channel at a time, can never cause loss of more than one of the two poles of the station, and operation can then be maintained with the other pole without serious consequences.

During monopolar operation, for example during maintenance work, one pole, for example P1, is in operation. For the other pole, both the main circuits—P2 in FIG. 1—and the protective circuits—PS2 in FIG. 2—are disconnected. The protective circuits for this pole can then be disconnected by opening the test switch P2TEST. The disconnected protective circuits are still connected to their measuring channels, as is clear from FIG. 2, and can be tested together with these channels without any risk. Since the test switch is open, mistakes during maintenance work and testing can never give rise to unjustified tripping signals to the bipole part.

As will be clear from the above description with reference to FIG. 2, the two sets P1BIPS1 and P1BIPS2 of the bipole protective means for the upper pole are designed such that full redundance is maintained during monopolar operation and during maintenance work. In this way, it is possible to maintain the operation of the station with full reliability both when a pole is disconnected in the event of a fault and during maintenance work anywhere within the station.

Figure 4:
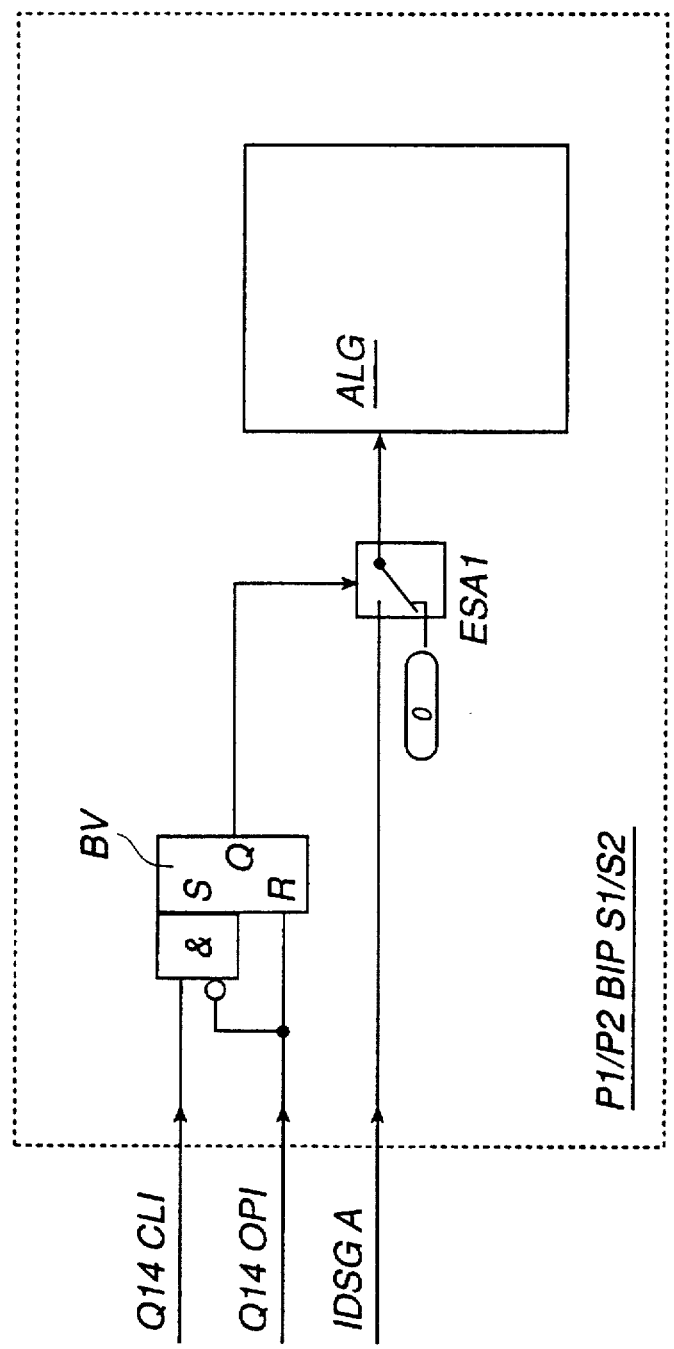
FIG. 4 shows how measurement signals can be arranged to be influenced by the status of relevant disconnectors to make possible reliable testing of the measuring means of the bipole part.

To eliminate the risk of unjustified tripping during testing of a measuring means, the algorithms of the protective means are supplied with the measurement signals which are utilized by a bipole protective means in dependence on status signals from the disconnectors of the bipole part. If the status signals of the disconnectors indicate that the measuring means is disconnected, the measurement signals from the measuring means are set to zero in the protective means. This is illustrated in FIG. 4, which shows as an example the measurement signal IDSGA from the measuring means BIP-T1 in FIG. 1. The signal is supplied to the algorithms ALG of the bipole protective means via the switching member ESA1. The latter is controlled dependent on the status signals Q14CLI and Q14OPI from the disconnector Q14 via a bistable flip-flop BV, the SET input of which is provided with an AND condition. As is clear from the figure, the control is carried out in such a way that ESA1 is activated when the status signal Q14CLI indicates that the disconnector Q14 is closed, whereby the measurement signal IDSGA is forwarded to the algorithms of the protective means. When the status signal indicates that the disconnector Q14 is open, on the other hand, ESA1 is not activated, whereby a signal corresponding to zero current is supplied to the algorithms. The measuring means can in this way be tested without any risk of unjustified tripping. The use of the bistable flip-flop BV requires an active status signal to change the position of the switching means ESA1. In this way, a loss of the two status signals, which may occur, for example, in the event of loss of auxiliary power, is prevented from causing a change of the position of the switching means.

The corresponding function is provided for the other measurement signal IDSGB of the measuring means, as well as for the other measuring means of the bipole part in dependent on the status signals from the disconnectors which are relevant to these measuring means.

The reliability of service during monopolar operation may be further increased by utilizing the fact that the direct current through a converter can only have one specific direction, defined as positive. A differential protective means for the neutral bar of the bipole part utilizes the fact that, during the non-faulty state, the sum of the currents into (or out from) the neutral bar is zero. If the sum of the measured currents differs from zero, this is a indication of a fault and causes a tripping signal. In a preferred embodiment of the protective equipment according to the invention, the tripping signal is blocked during monopolar operation if the measured sum current has a sign that the current through the converter in operation is negative. The reason is that such a sign in the sum current must be due to an error of measurement, and by the function described below, an error of measurement is prevented from causing an unjustified tripping.

Figure 6:
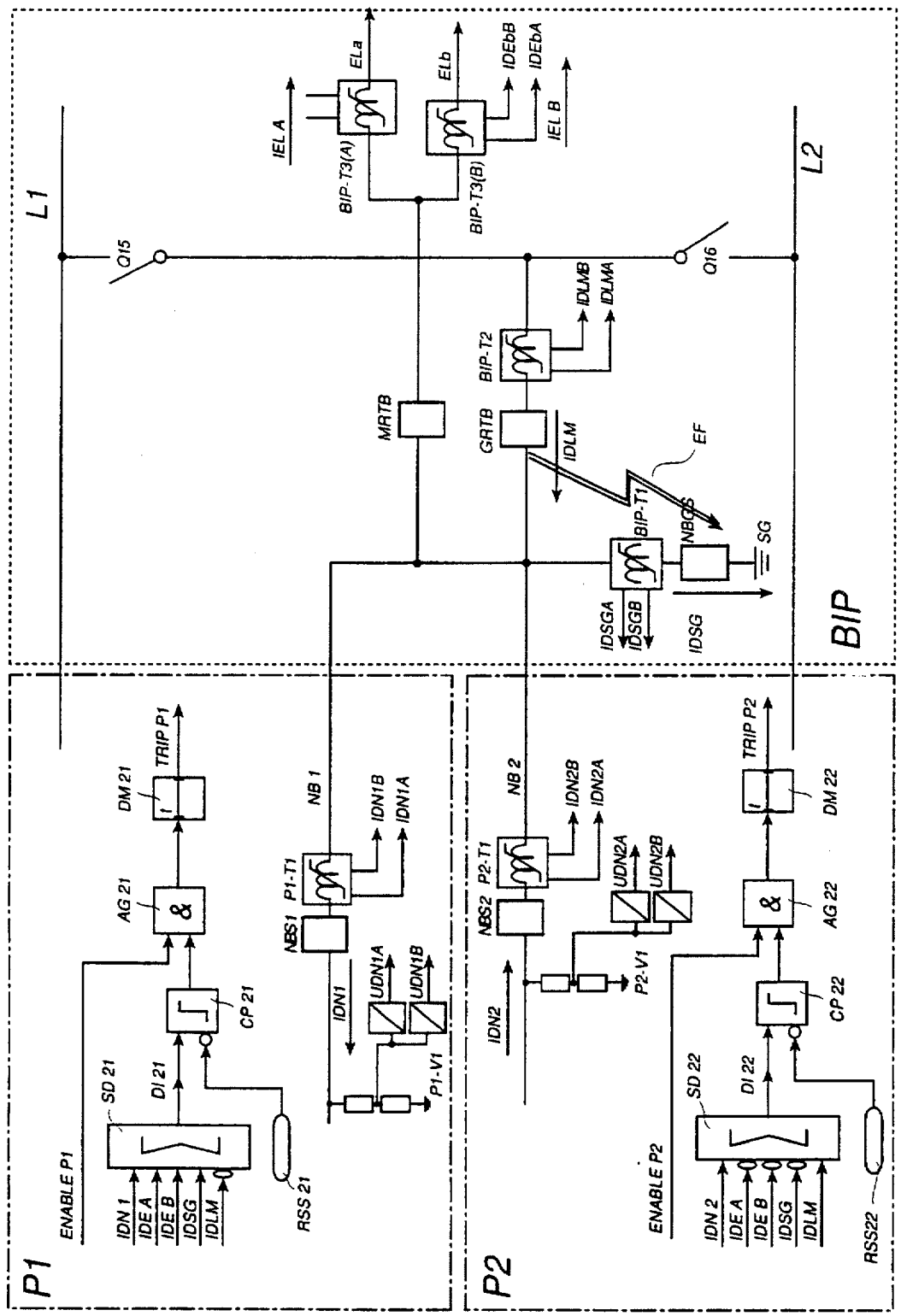
FIG. 6 shows how the bipole protective means of the station can be designed for preventing unjustified tripping during monopolar operation.

This function is illustrated in FIG. 6 which shows relevant parts of the main circuits of the station with the same designations as in FIG. 1. In the pole parts P1 and P2, those parts of the bipole protective means are shown which constitute the differential protective means for the bipole part BIP and which are active in monopolar operation. For pole P1 this protective means consists of a summation circuit SD21, which sums the currents to and from the bipole part (with a positive sign for currents out of the bipole part) in those cases where pole 1 is in operation and pole 2 is disconnected. The sum signal DI21 is compared with a low reference value in a comparator CP21. The reference value is obtained from a reference-value generator RSS21. If the sum signal exceeds the reference value, a "1" signal is delivered to an AND circuit AG21. To a second input of the AND circuit, a signal "ENABLE P1" is fed, which activates the protective means now described if pole P1 is in normal monopolar operation, which, for example, is indicated by the fact that the relevant disconnectors are positioned in their correct positions for this operating case, and by the fact that the monitoring of current measurement units indicates that their function is not disturbed. The output signal of the AND circuit is supplied to a delay circuit DM21, which, at a certain time t after a received input signal, delivers a tripping signal "TRIP P1" to the control system of the pole.

An actual fault, for example the symbolically drawn ground fault EF during monopolar operation with the pole P1, normally entails a reduction of the current through the electrode line and hence a positive output signal DI21 from the summation circuit and a tripping signal to the pole. In monopolar operation, a tripping signal must be given in order for current extinction in a permanent fault to be performed. Thus, the protective means reacts correctly to actual faults.

Certain measurement faults, however, for example a measurement fault which results in too high an electrode line current, result in the output signal DI21 from the summation circuit becoming negative. This would correspond to a negative current through the converter of the pole P1, which is a physical impossibility. In this case, therefore, because the comparator CP21 is sensitive to the sign of its input signal, no output signal is obtained from the comparator and hence no tripping of the pole. In this way, one reason for unjustified tripping is eliminated.

The bipole protective means for the pole P2 has a corresponding construction and function and differs only in that a "1" in the designations is replaced by a "2".

It is of importance that monopolar operation be regarded as a mode of operation only when the second pole is completely isolated. The signals "ENABLE P1/P2" ensure that the bipole protective means of one pole according to FIG. 6 is activated only when both the neutral disconnectors of the other pole indicate open position. Further, no current measurement from a blocked pole is included in the algorithm of the other pole, which is clear from FIG. 6. This is a precondition for ensuring that both poles are not tripped for one single fault. For example, a fault in the measurement of the current IDN1/2 in the neutral bar in one pole results in an intervention from the pole protective means of the pole in question, which takes the pole out of operation. If then the bipole protective means of the remaining pole should use the faulty current measurement of the disconnected pole, that pole would also be disconnected and a loss of both poles of the station would have been caused by one single measurement fault. This is eliminated with the aid of the system described above.

Figure 7:
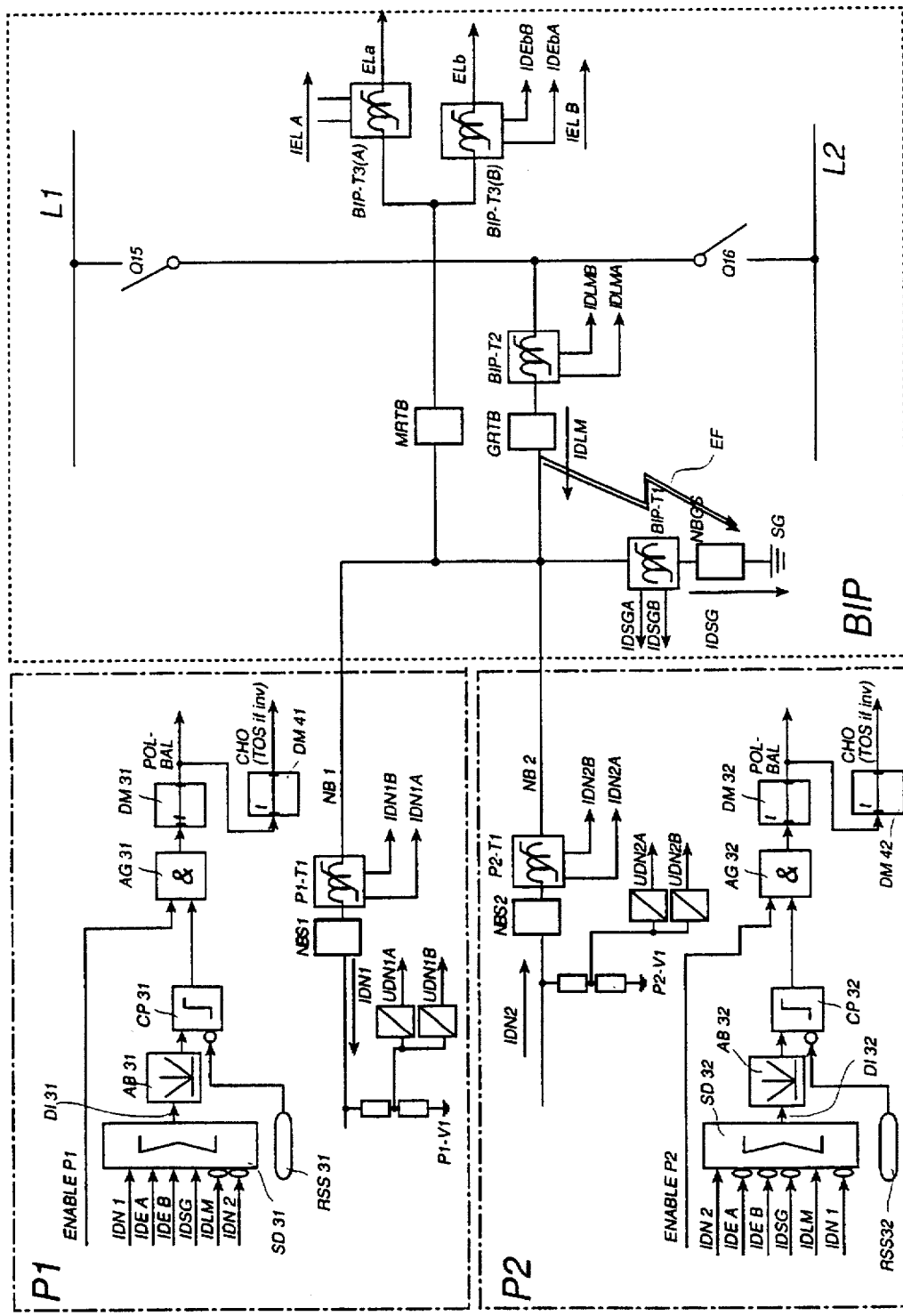
FIG. 7 shows how the bipole protective means of the station can be designed for preventing tripping during bipolar operation.

FIG. 7 shows the corresponding function of the bipole protective means in bipolar operation. The bipole protective means of the pole P1 has a summation circuit SD31, which is supplied with the current measurement signals from all the current measuring means which measure currents to or from the bipole part BIP. The output signal DI31 constitutes the sum, taking into consideration the chosen polarities, of all the currents out from the bipole part. In a non-faulty state, this sum is zero. The output signal is supplied to an absolute-value generator AB31 and is compared in a comparator CP31 with a low reference value obtained from a reference-value generator RSS31. If the absolute value of the signal DI31 exceeds the reference value, a signal "1" is supplied to an AND circuit AG31. A second input of the AND circuit is supplied with a signal "ENABLE P1" which is "1" if the relevant disconnectors are in their correct positions for this operating case, and that the monitoring of the measurement units in question indicate that their function is not disturbed. An output signal "1" from the AND circuit is an indication of a ground fault in the bipole part of the station and is supplied to a first delay circuit DM31, the output signal "POLBAL" of which orders pole balancing. This means that the pole which has the highest current is ordered to reduce its current until both poles carry the same current.

In case of an actual fault, for example the ground fault EF shown in the figure, the fault current is effectively extinguished by the pole balancing. Therefore, the operation can be maintained without any drawback. After balancing, the output signal from the comparator CP31 is "0", but the pole balancing remains in operation until it is reset by the operator.

If, on the other hand, a detected fault current is not extinguished, this is probably due to an incorrect measurement in the control system of the rectifier. Therefore—if the fault signal does not disappear within a certain time—a signal CHO(TOS if inv) is obtained from a second delay circuit DM41. This signal executes a switching to a redundant control system of the rectifier, with redundant measuring transducers, whereby the fault signal should disappear. In those cases where the station operates in inverter operation, the other station of the transmission is current-controlling, and the order for pole balancing is then transferred to this station. If the transition to a redundant control system (possibly to the second station) should not cause the fault signal to disappear (which, e.g., may occur in case of a fault in the switchgear of the inverter or in case of telecommunication faults), the operator can manually adjust the current orders between the poles so as to achieve balancing.

The bipole protective means of the pole P2 is designed in the same way as that described above.

Most likely, it is a measuring transducer fault that activates the bipole protective means in bipolar operation, since the poles are normally always balanced in this mode of operation and, therefore, no current flows through the bipole switchgear. For this reason, in this operating case, only protective measures which do not entail tripping of a pole are taken. The protective measures consist of pole balancing, transfer to a redundant control system (possibly to the second station), and possibly an alarm to the operator.

In the manner described above with reference to FIGS. 6 and 7, faulty trippings of both poles in the station are avoided, and complete reliability for monopolar operation and for bipolar operation is achieved. All the faults in the main circuit are detected and the least possible disconnection takes place.

The bipole protective means of both poles are provided with protective means against a high voltage on the neutral bar. A high voltage on the neutral bar may be caused by a poor contact to ground via the electrode line—symbolically shown in FIG. 8 by the zigzag line BC. Such a high voltage may be caused to disappear by closing the circuit breaker NBGS of the bipole part. This circuit breaker is not intended to carry current normally but is temporarily used for special fault cases with higher currents or continuously with a low or no current (e.g. in case of maintenance on the electrode line).

Figure 8:
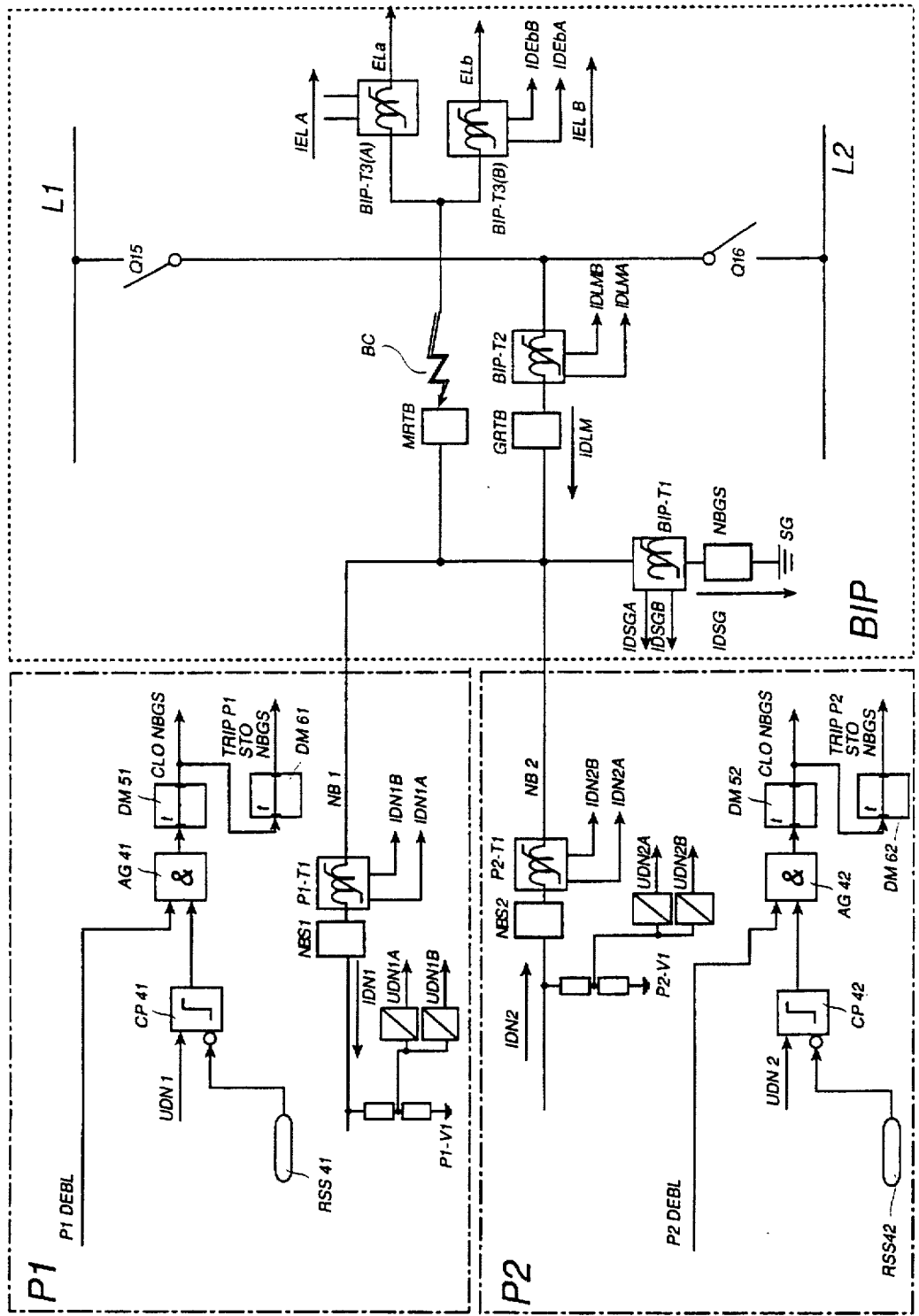
FIG. 8 shows how the bipole protective means of the station can be designed for maintaining monopolar operation in case of incorrect indication of overvoltage on the neutral bar.

As shown in FIG. 8, the bipole protective means of the pole P1 comprises a comparator CP41 which compares the measured neutral bar voltage UDN1 with a reference value from a reference-value generator RSS41. If the measured voltage exceeds the reference value, a "1" signal is obtained from the comparator to an AND circuit AG41. This circuit is controlled by a signal "P1 DEBL" which is "1" when the converter of the pole P1 is deblocked and which becomes "0" when the converter is tripped and blocked. The output signal of the AND circuit is supplied to a first delay circuit DM51, which after a time interval supplies a signal "CLO NBGS" for closing of the circuit breaker NBGS. If the fault signal from the comparator remains after a certain time after the closing of the circuit breaker, a second delay circuit DM61 supplies a signal "TRIP P1 STO NBGS", which signal provides tripping of the pole P1, that is, blocking and isolation of the converter of the pole, and also—when the isolation is finished—orders opening of the circuit breaker.

The bipole protective means of pole P2 is built up in the same way as that now described for pole P1.

If the neutral bar voltage, for example because of a high resistance in the electrode line, exceeds the permissible value, an order for closing the circuit breaker NBGS is supplied from the bipole protective means of both the poles. Upon closing of the circuit breaker, the high voltage disappears. The operation of both the poles may proceed undisturbed while the fault on the electrode line is corrected.

If, on the other hand, a faulty measuring apparatus causes the pole protective means of one pole to detect a high neutral bar voltage, an order for closing of the circuit breaker NBGS is obtained from this protective means. This does not influence the faulty measurement signal, and after a certain time, the signal "TRIP P1 STO NBGS" is therefore supplied from the protective means. The pole is tripped, the current of the remaining pole now for the most part being passed down into the station ground. A continuous current through the station ground is avoided by giving an order, after the first-mentioned pole has been tripped, for opening of the circuit breaker NBGS. The current of the remaining pole then commutates over from the station ground to the electrode line, and continued monopolar operation of the station is maintained.

What is claimed is:

1. Protective equipment for avoiding permanent fault in a bipolar converter station of a high-voltage direct current power transmission installation comprising, main circuits on the dc side of the station having two separate pole parts, one part for each one of the two poles of the station, and a bipole part that is common to both poles;

measuring means in the station forming measurement signals corresponding to operating quantities of the station;

pole protective means for each pole part and a bipole protective means for protection of the bipole part;

the bipole protective means has two parts that are independent of each other, each of which is assigned to one of the two pole parts of the station, one to each pole part;

the measuring means, for each one of a group of operating quantities of the bipole part, generates two redundant measurement signals, each of which is supplied to one of the independent parts of the bipole protective means, and wherein the part of the bipole protective means that is assigned to a certain pole part, as a protective measure which, based on predetermined algorithms and said measurement signals, interrupts the operation of the pole part, interrupts the operation of only that pole part to which it is assigned.

2. Protective equipment according to claim 1, wherein each one of the two parts of the bipole protective means is provided with a test switch for preventing order signals from the relevant part of the bipole protective means from causing an operation of electric switching devices of the bipole part.

3. Protective equipment according to claim 1, comprising current-measuring means for sensing currents at a plurality of locations in the installation, as well as means which on the basis of the sensed currents form an indicating signal which in a non-faulty state is zero, and means which trigger a protective measure if the indicating signal deviates from zero, and means which during monopolar operation block said protective measure if the indicating signal indicates a negative current through the converter in operation.

4. Protective equipment according to claim 1, in which the bipole part has a circuit breaker for connection of the neutral bar of the bipole part to a station ground, wherein each one of the two parts of the bipole protective means has means for ordering closing of the circuit breaker at an overvoltage on the neutral bar and, when an indication of overvoltage remains, orders tripping of that pole to which the relevant part of the bipole protective means belongs, and, thereafter, orders opening of the circuit breaker.

5. Protective equipment according to claim 1, in which a measuring means is assigned to an electric switching device for disconnection of the measuring means, wherein a measurement signal from the measuring means is supplied to the bipole protective means via switching means which, in dependence on status signals from the switching devices, when the measuring means is disconnected, supplies the bipole protective means with a signal corresponding to a measured value of zero.

6. Protective equipment according to claim 5, wherein the switching means comprise means for preventing a change of the status of the switching means when the status signals from the switching devices are lost.

7. Protective equipment according to claim 1, wherein each one of the two parts of the bipole protective means has two sets of at least partially redundant protective functions which operate in parallel with each other.

8. Protective equipment according to claim 7, wherein one set of protective functions receives a first measured value from a measuring means measuring the current in a first conductor in the bipole part, and the other set is supplied with measured values from measuring means measuring the currents in other conductors in the bipole part and, on the basis of these measured values forms a second measured value corresponding to the current in the first conductor.

9. Protective equipment according to claim 8, wherein the bipole part has two parallel electrode lines, and two separate measuring means each measuring the current in one of the electrode lines.

10. Protective equipment in a bipolar converter station of a high voltage direct current power transmission installation comprising:

main circuits on the dc side of the station having two separate pole parts, a first part for each one of the two poles of the station, and a second bipole part that is common to both poles;

measuring means in the station which forms measurement signals corresponding to operating quantities of the station;

means which, in response to the measurement signals with predetermined algorithms, selectively influences the operation of the station to avoid permanent faults;

a first pole protective means for each first pole part and a second bipole protective means for protection of the second bipole part;

the second bipole protective means has two parts, each of which is assigned to one of the two pole parts of the station;

the measuring means, for each one of a group of operating quantities of the second bipole part, generates two redundant measurement signals each of which is supplied to one of the parts of the bipole protective means; and the part of the bipole protective means which is assigned to a certain pole part comprises a differential protective means for the bipole part, which during bipolar operation balances the pole current in the station, generates an alarm signal, and transfers control to a redundant control system.

* * * * *